(12) United States Patent
Deutsch et al.

(10) Patent No.: US 12,039,431 B1
(45) Date of Patent: Jul. 16, 2024

(54) SYSTEMS AND METHODS FOR INTERACTING WITH A MULTIMODAL MACHINE LEARNING MODEL

(71) Applicant: c/o OpenAI Opco, LLC, San Francisco, CA (US)

(72) Inventors: Noah Deutsch, San Francisco, CA (US); Nicholas Turley, San Francisco, CA (US); Benjamin Zweig, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 18/475,588

(22) Filed: Sep. 27, 2023

(51) Int. Cl.
*G06N 3/0455* (2023.01)
*G06N 3/08* (2023.01)

(52) U.S. Cl.
CPC ............. *G06N 3/0455* (2023.01); *G06N 3/08* (2013.01)

(58) Field of Classification Search
CPC ............................... G06N 3/0455; G06N 3/08
See application file for complete search history.

(56) References Cited

U.S. PATENT DOCUMENTS

| | | | |
|---|---|---|---|
| 9,978,361 B2 | 5/2018 | Sarikaya et al. | |
| 10,140,553 B1 * | 11/2018 | Vasisht | G06V 20/20 |
| 10,255,265 B2 | 4/2019 | Das et al. | |
| 10,412,318 B1 * | 9/2019 | Ong | G06T 3/0006 |
| 11,037,024 B1 * | 6/2021 | Ratti | G06T 7/11 |
| 11,568,627 B2 | 1/2023 | Price et al. | |
| 2015/0135125 A1 * | 5/2015 | Bhatt | G06F 3/0481 |
| | | | 715/781 |
| 2019/0004821 A1 | 1/2019 | Uppal et al. | |
| 2019/0147073 A1 * | 5/2019 | Bakir | G06F 16/532 |
| | | | 382/305 |
| 2019/0236394 A1 * | 8/2019 | Price | G06V 10/945 |
| 2020/0054307 A1 * | 2/2020 | Silberman | G06N 3/08 |
| 2020/0184623 A1 * | 6/2020 | Price | G06V 10/764 |
| 2020/0226798 A1 * | 7/2020 | Morard | G06T 7/12 |
| 2020/0380258 A1 * | 12/2020 | Yu | G06V 10/7788 |

(Continued)

OTHER PUBLICATIONS

Peng Xu et al., Multimodal Learning with Transformers: A Survey, arXiv:2206.06488, May 10, 2023.

*Primary Examiner* — Xuemei G Chen
(74) *Attorney, Agent, or Firm* — Finnegan, Henderson, Farabow, Garrett & Dunner LLP

(57) ABSTRACT

The disclosed embodiments may include a method of interacting with a multimodal machine learning model; the method may include providing a graphical user interface associated with a multimodal machine learning model. The method may further include displaying an image to a user in the graphical user interface. The method may also include receiving a textual prompt from the user and then generating input data using the image and the textual prompt. The method may further include generating an output at least in part by applying the input data to the multimodal machine learning model, the multimodal machine learning model configured using prompt engineering to identify a location in the image conditioned on the image and the textual prompt, wherein the output comprises a first location indication. The method may also include displaying, in the graphical user interface, an emphasis indicator at the indicated first location in the image.

20 Claims, 12 Drawing Sheets

(56) References Cited

U.S. PATENT DOCUMENTS

| | | | | |
|---|---|---|---|---|
| 2020/0402237 | A1* | 12/2020 | Song | G06T 7/0012 |
| 2021/0019358 | A1* | 1/2021 | Duckworth | G06F 16/5854 |
| 2021/0073977 | A1* | 3/2021 | Carter | G06T 11/20 |
| 2021/0216745 | A1* | 7/2021 | Gildenblat | G06F 18/217 |
| 2021/0216822 | A1* | 7/2021 | Paik | G06T 7/0012 |
| 2021/0295084 | A1* | 9/2021 | Sudakov | G06V 30/18076 |
| 2021/0304509 | A1* | 9/2021 | Berkebile | G06F 3/04815 |
| 2021/0397942 | A1* | 12/2021 | Collomosse | G06F 16/583 |
| 2022/0057987 | A1* | 2/2022 | Wheless | G06F 3/167 |
| 2022/0114803 | A1* | 4/2022 | Wang | G06V 10/70 |
| 2022/0163455 | A1* | 5/2022 | Pollak | G06Q 30/0641 |
| 2022/0245926 | A1* | 8/2022 | Huang | G06V 10/454 |
| 2022/0291789 | A1* | 9/2022 | Jones | G06Q 30/02 |
| 2022/0300759 | A1* | 9/2022 | Walli | G06V 10/235 |
| 2022/0382968 | A1* | 12/2022 | Lim | G06T 11/60 |
| 2023/0123430 | A1 | 4/2023 | Dolan et al. | |
| 2023/0297661 | A1* | 9/2023 | Lancashire | G06F 21/62 |
| | | | | 726/7 |
| 2023/0298338 | A1* | 9/2023 | Yoffe | G06V 30/10 |
| | | | | 382/159 |

* cited by examiner

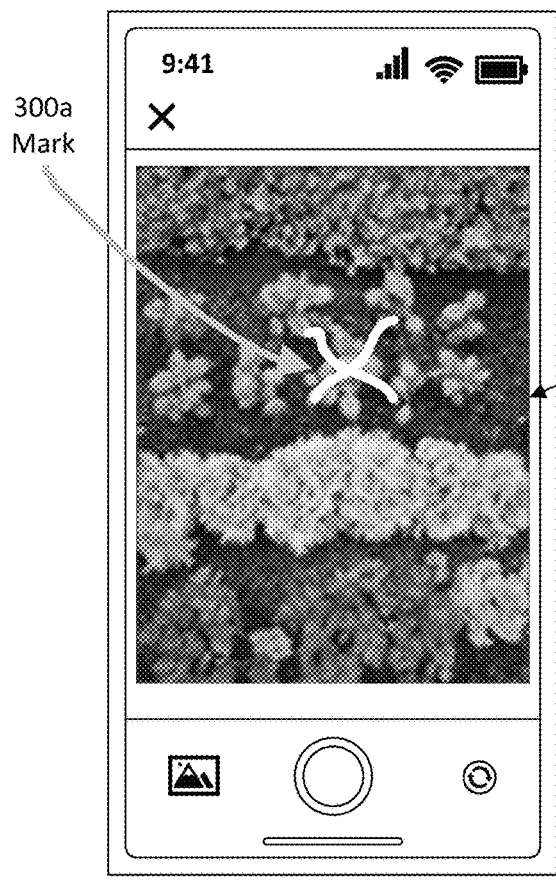
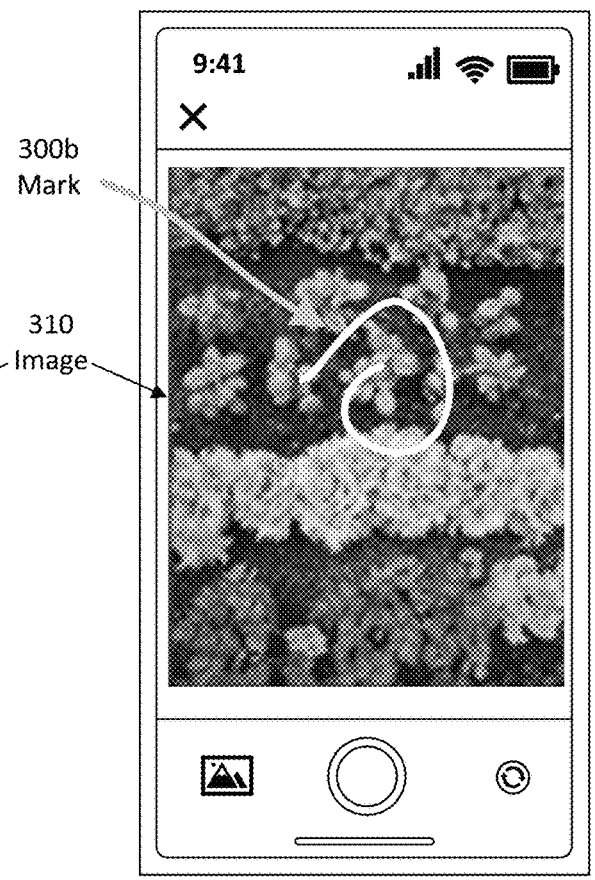
FIG. 3D  FIG. 3E

SYSTEMS AND METHODS FOR INTERACTING WITH A MULTIMODAL MACHINE LEARNING MODEL

FIELD OF DISCLOSURE

The disclosed embodiments relate generally to methods and systems for interacting with machine learning models. More specifically, and without limitation, this disclosure relates to systems and methods for interacting with a multimodal machine learning model using graphical interfaces.

BACKGROUND

Machine learning (ML) models are able to interact with a user via a user interface (UI) such as a graphical user interface (GUI), integrated with an application programming interface (API). In conventional ML systems, users interact with the model via textual conversations. Large language models (LLMs) and multimodal machine learning models are capable of processing multiple text input (also known as prompts) and generating a response. The model can perform certain tasks based on a user-provided textual input. However, for certain tasks, the use of text-input only can be inefficient. For example, if a user wants to interact with images, figures, videos, or other media, the user may need to textually describe the media, describe the media characteristics, and/or specific features in the media. This can be tedious and inefficient as users may need to input multiple prompts, frequently test the model's understanding of the description, and/or correct model interpretations. The text-based description (e.g., via prompts) of figures or other media to a model may also be challenging for certain users and may result in negative user experiences.

Moreover, LLM interactions with media user text-based input can be inefficient, not only for users, but also for use of computer resources. For example, describing media to the large language model may require multiple prompts and each prompt may necessitate specific processing by the model consuming server resources and network bandwidth.

The disclosed systems, apparatuses, devices, and methods are directed to overcoming these and other drawbacks of existing systems and for improved systems and methods for interacting with multimodal machine learning models, LLMs, machine learning and/or Artificial Intelligence (AI) models.

SUMMARY

Embodiments of the present disclosure present technological improvements as solutions to one or more of the above-mentioned technical problems recognized by the inventors in conventional systems. For example, the presently disclosed embodiments may include a method of interacting with a multimodal machine learning model; the method may include providing a graphical user interface configured to enable a user to interact with an image to generate a contextual prompt that indicates an area of emphasis in the image. The method may further include receiving the contextual prompt, then generating input data using the image and the contextual prompt. The method may also include generating a textual response to the image by applying the input data to a multimodal machine learning model configured to condition the textual response to the image on the contextual prompt, and then providing the textual response to the user.

According to some embodiments, generating the input data using the image and contextual prompt comprises generating an updated image based on the contextual prompt and generating the input data using the updated image.

According to some embodiments, generating the input data using the image and the contextual prompt comprises generating a segmentation mask by providing the image and the contextual prompt to a segmentation model and generating the input data using the image and the segmentation mask.

According to some embodiments, generating the input data using the image and the contextual prompt comprises generating a textual prompt or token using the contextual prompt and generating the input data using the image and the textual prompt or token.

According to some embodiments, receiving the contextual prompt concerning the image comprises detecting a user human interface device interaction.

According to some embodiments, the graphical user interface includes an annotation tool and the contextual prompt concerning the image comprises an annotation generated using the annotation tool.

According to some embodiments, the method further includes receiving a textual prompt from the user, the input data is further generated using the textual prompt, and the multimodal machine learning model is configured to further condition the textual response to the image on the textual prompt.

According to some embodiments, the textual response comprises a prompt suggestion, providing the textual response comprises displaying a selectable control in the graphical user interface configured to enable the user to select the prompt suggestion, and the method further comprises, in response to the selection of the control by the user, generating second input data using the prompt suggestion and the image, generating a second response by applying the second input data to the multimodal machine learning model, and providing the second response to the user.

According to some embodiments, the contextual prompt indicates an object depicted in the image and the textual response concerns the depicted object.

The presently disclosed embodiments may include a system comprising at least one processor and at least one non-transitory computer readable medium containing instructions that, when executed by the at least one processor, cause the system to perform operations comprising providing a graphical user interface configured to enable a user to interact with an image to generate a contextual prompt that indicates an area of emphasis in the image. The operations may further comprise receiving the contextual prompt, generating input data using the image and the contextual prompt, generating a textual response to the image by applying the input data to a multimodal machine learning model configured to condition the textual response to the image on the contextual prompt and providing the textual response to the user.

Other methods and systems are also discussed within. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 3B, 3C, 3D, 3E, and 3F illustrate example views of images with user contextual prompts, according to some embodiments of the present disclosure.

DETAILED DESCRIPTION

Figure 1:
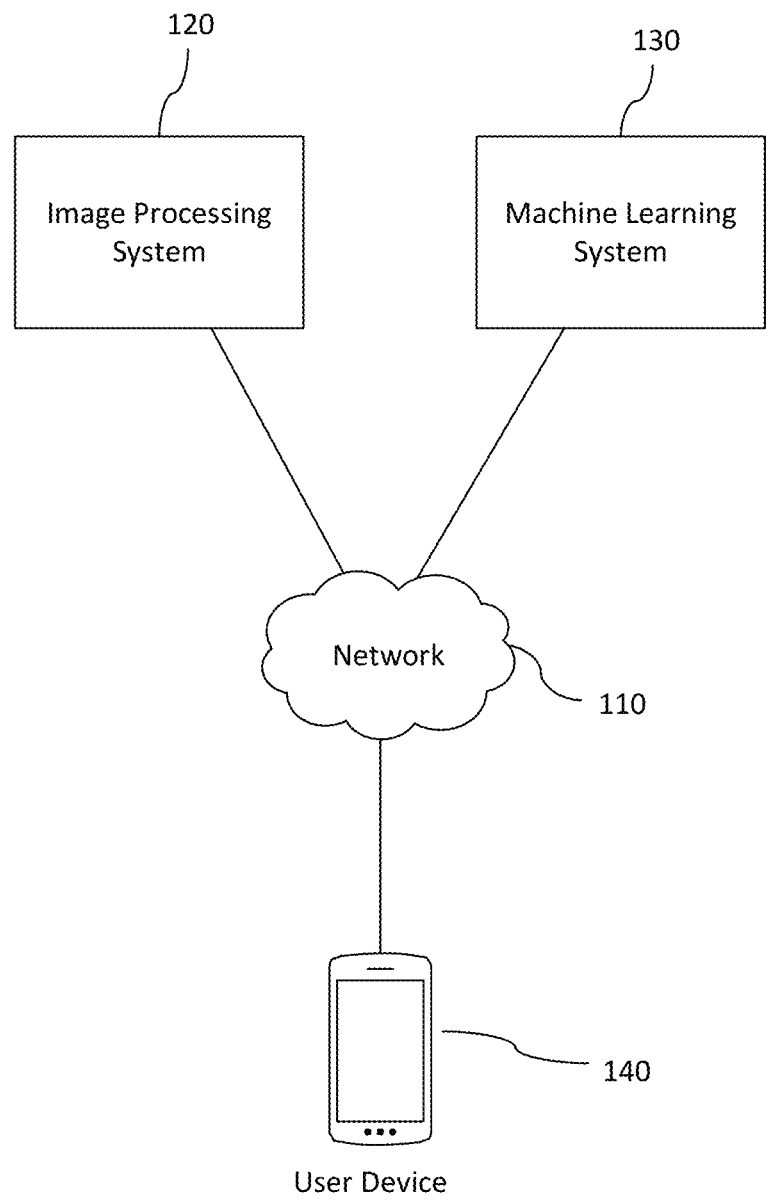
FIG. 1 depicts an exemplary system in which the disclosed embodiments may be implemented.

Exemplary embodiments are described with reference to the accompanying drawings. In the figures, the left-most digit(s) of a reference number identifies the figure in which the reference number first appears. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

The embodiments discussed herein involve or relate to artificial intelligence. AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Multimodal machine learning models (multimodal LLMs) are capable of processing multiple kinds of information such as text, images, videos, media, and other sensory inputs. Users can interact with multimodal LLMs via a graphical user interface (GUI) and can ask the model to perform certain tasks. These tasks may include, given an image and a textual prompt relating to the image, providing the user with a response to the textual prompt.

Currently however, if a user wants to bring a particular element of an image to the attention of the model, the user has to textually describe the location of the element within the image. This is a tedious task and, overall, creates an unsatisfying user experience in interacting with the machine learning model.

The embodiments discussed herein improve the technical field of interacting with machine learning models by detailing various methods and systems in which, for example, a user can indicate to a machine learning model such as a multimodal LLM an area to focus on by providing a contextual prompt. The contextual prompt can be, for example, in the form of a click or an annotation on the particular part of the image the user wishes to emphasize. This removes the requirement for a user to provide a lengthy textual prompt detailing the location of particular element within an image and provides a simpler and more satisfying user experience within the GUI.

FIG. 1 is a schematic diagram illustrating an exemplary system environment in which the disclosed systems and methods for interacting with machine learning models such as multimodal LLMs can be employed.

System 100 may include any number, or any combination of the system environment components shown in FIG. 1 or may include other components or devices that perform or assist in the performance of the system or method consistent with disclosed embodiments. The arrangement of the components of system 100 shown in FIG. 1 may vary.

FIG. 1 shows system 100, including image processing system 120, machine learning system 130, and user device 140 communicatively connected via network 110. In some embodiments, a user may access and interact with a machine learning model hosted by machine learning system 130 via a GUI run on user device 140, for example, to submit requests in relation to one or more images or to manipulate such one or more images. To respond to such requests, the machine learning model may employ image processing system 120 when processing images according to the requests submitted by the user.

Network 110 may be a wide area network (WAN), local area network (LAN), wireless local area network (WLAN), Internet connection, client-server network, peer-to-peer network, or any other network or combination of networks that would enable the system components to be communicably linked. Network 110 enables the exchange of information between components of system 100 such as image processing system 120, machine learning system 130, and user device 140.

Image processing system 120 can be configured to perform the execution of tasks such as image acquisition, analysis, and manipulation. Manipulation may include image enhancement, segmentation, restoration, compression, etc. In some embodiments, image processing system 120 can be a conventional image processing system.

Machine learning system 130 may host one more or more machine learning models, such as a multimodal LLM. In some embodiments, machine learning system 130 also manages the training of at least one machine learning model, such as a multimodal LLM. In some embodiments, machine learning system 130 can be a conventional machine learning system.

User device 140 can be any of a variety of device type, such as a personal computer, a mobile device like a smartphone or tablet, a client terminal, a supercomputer, etc. In some embodiments, user device 140 comprises at least one monitor or any other such display device. In some embodiments, user device 140 comprises at least one of a physical keyboard, on-screen keyboard, or any other input device through which the user can input text. In some embodiments, user device 140 comprises at least one of a computer mouse or any other input device through which the user can point and click within a GUI. In some embodiments, user device 140 allows a user to interact with a GUI (for example a GUI of an application run on or supported by user device 140) using a machine learning model, such as a multimodal LLM. For example, while interacting with the GUI, the user of user device 140 may interact with a multimodal LLM that automates, for the user, certain functions of the GUI in cooperation with image processing system 120 and/or machine learning system 130.

Figure 2:
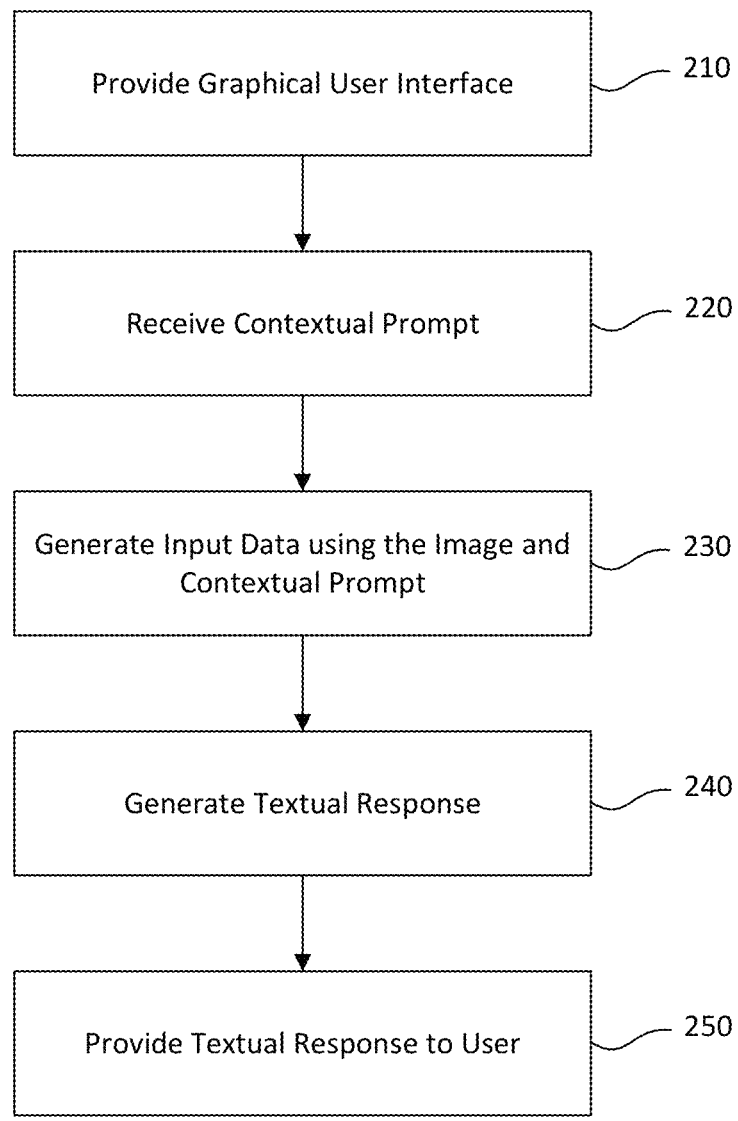
FIG. 2 depicts an exemplary method for interacting with a machine learning model such as a multimodal LLM, according to some embodiments of the present disclosure.

FIG. 2 depicts an exemplary method 200 for interacting with a machine learning model such as a multimodal LLM, according to some embodiments of the present disclosure.

Method 200 can be performed (e.g., executed) by a system supporting the use of machine learning models, such as system 100 of FIG. 1, system 700, system 800, or any computing device. In some embodiments, method 200 can be implemented using at least one processor (e.g., processor 706 in FIG. 7), which may execute one or more instructions stored in memory, such as on a computer-readable medium (e.g., data storage device 708 of FIG. 7). For ease of explanation, steps of method 200 are described as being performed by the at least one processor; however, other components or devices could be used additionally or instead as appropriate. While the steps in FIG. 2 are shown in a particular exemplary order, the individual steps may be reordered, omitted, and/or repeated. Steps described in method 200 may include performing operation described in the present disclosure with reference to FIGS. 1 and 3 to 6.

In some embodiments, method 200 begins at step 210 shown in FIG. 2. At step 210, at least one processor provides a user with a GUI on user device 140. For example, the at least one processor can cause the GUI to be displayed on the user device 140. In some embodiments, the GUI displays an image to a user and is configured to enable a user to interact with the image in order to generate a contextual prompt that indicates an area of emphasis within the image.

In some embodiments, the image displayed to the user may be selected by the at least one processor or the machine learning model. For example, the at least one processor or the machine learning model may select the image randomly or at the request of the user. In some embodiments, the image may be selected given a specific prompt. In other embodiments, the image may be selected from pre-stored images or images obtained from elsewhere such as, for example, from a source found on the Internet. In some embodiments the image may be provided by the user to the model by, for example, uploading it via the GUI of step 210, or downloading into a server, computer, or machine associated with the model. In some embodiments, the image may be generated by the machine learning model. The machine learning model may generate the image randomly, or at a request of the user, for example, given a specific prompt. In some embodiments, the image is a current screen shot of the GUI state shown to the user. The image may also be obtained in an alternative way to the preceding examples.

At step 220 shown in FIG. 2, the at least one processor receives a contextual prompt. In some embodiments, the user may input this contextual prompt via a GUI on user device 140. In some embodiments, receiving the contextual prompt can include detecting a user human interface device interaction. In some embodiments, the user human interface device interaction can include at least one of a mouse click, a touchscreen press, or any other such interaction.

A contextual prompt may be, but not limited to, an indication of an area or region of emphasis or focus within an image on the GUI. In some embodiments, the contextual prompt is in the form of an annotation of an annotation tool in the GUI. In some embodiments, the contextual prompt is in the form of a click input by the user on user device 140 via a peripheral device such as a computer mouse. In some embodiments, the contextual prompt can indicate an object depicted within an image. In some embodiments, the GUI enables the user to resize an area of effect of the annotation tool, in order to focus the model on a bigger or smaller area of an image. In some embodiments, the annotation tool can comprise a loupe annotation, a marker, a segmentation tool, or any other such means of annotation. In some embodiments, a mark can be of any shape chosen by the user.

Segmentation is a commonly used technique in digital image processing and analysis to partition an image into multiple parts or regions, often based on the characteristics of the pixels in the image. In some embodiments, a segmentation tool of an annotation tool allows a user to choose an area of emphasis within an image via a user human interface device interaction, for example, in order to isolate it from the rest of an image. For example, a user wishing to draw focus to a person from within an image can use a segmentation tool of an annotation tool to group all the pixels corresponding to that person within the image, isolating the person from the rest of the image and enabling the machine learning model to provide responses corresponding to the person within the image.

At step 230 shown in FIG. 2, the at least one processor generates input data using the image and the contextual prompt received from the user. In some embodiments, the input data is generated in the form that could be applied to the machine learning model, such as a multimodal LLM, and provide such a model with information necessary to complete the request defined by the contextual prompt. For example, if the machine learning model is a transformer type model, generating the input data can comprise the at least one processor tokenizing both the image and contextual prompt of the user into separate sequences of tokens. Tokenization refers to the splitting of an input into discrete parts than can subsequently be embedded into a vector space, allowing the input to be passed into the machine learning model.

The type of tokenization is dependent on the modality of the input. In some embodiments, tokenization of the image and contextual prompt can be in the form of one or more of patches, region-of-interest (RoI), or any other type of tokenization suitable for images. In some embodiments, after tokenization of both the contextual prompt and the image, the at least one processor can concatenate the tokenized contextual prompt and the tokenized image to form a singular tokenized input for embedding into a vector space.

In some embodiments, the at least one processor can generate an embedding of the concatenated tokenized input into a vector space using one or more of a convolutional neural network (CNN), a linear projection, a learned embedding, a graph neural network (GNN), or any other type of suitable embedding process.

In some embodiments, generating the input data using the image and the contextual prompt comprises generating a segmentation mask and generating the input using the image and the segmentation mask. In some embodiments, the segmentation mask is generated by the at least one processor providing the image and contextual prompt to a segmentation model of image processing system 120.

In some embodiments, generating the input data can comprise generating an updated image based on the user contextual prompt and then generating the input data using the updated image. In some embodiments, generating the input data using the image and user contextual prompt comprises generating a textual prompt or token using the contextual prompt and then generating the input data using the image and the textual prompt or token, wherein the textual prompt or token indicates at least one set of coordinates of a location within the image, as indicated by the contextual prompt of the user. A token can be a sequence of characters that represents a meaningful unit of text, such as a word, a punctuation mark, a number, or any other symbol that has a semantic or syntactic role in the text.

In some embodiments, the machine learning model of machine learning system 130 generates a textual prompt or token using the contextual prompt by utilizing a segmentation model of image processing system 120, configured to perform semantic segmentation. Semantic segmentation may include a deep learning algorithm that assigns a class label to every pixel within an image. For example, a segmentation model of image processing system 120 can be configured to recognize certain objects within an image, such as (but not limited to) human beings, animals, inanimate objects etc., and then the machine learning model can generate a textual prompt or token using the identified objects.

At step 240 shown in FIG. 2, the at least one processor generates an output by applying the input data to the machine learning model. In some embodiments, the output consists of a textual response from the model. The machine learning model, such as a multimodal LLM, of machine learning system 130 may be configured to condition its textual response to the image based on the contextual prompt. For example, in some embodiments, when the contextual prompt indicates an object depicted within the image, the textual prompt also concerns the depicted object. In some embodiments, the machine learning model may be configured to use prompt engineering to generate a textual response. Prompt engineering refers to an AI engineering technique implemented in order to optimize machine learning models, such as multimodal LLMs, for particular tasks and outputs. Prompt engineering involves creating precise and informative questions or instructions that allow the model to output the desired response. These prompts serve as precise inputs that direct the behavior of the model.

For example, in some embodiments, input data generated by the at least one processor can comprise the image, the contextual prompt of the user, and/or a prepended textual prompt generated by, for example, the model through prompt engineering. In some embodiments, this prepended textual prompt can direct the model to produce an output of a particular format. In some embodiments, the prepended textual prompt can direct the model to provide particular types of information regarding the area of the image to which the contextual prompt is applied.

In step 250 shown in FIG. 2, the at least one processor provides the textual response to the user. For example, the at least one processor displays the textual response to the user via a GUI on user device 140.

Figure 3A:
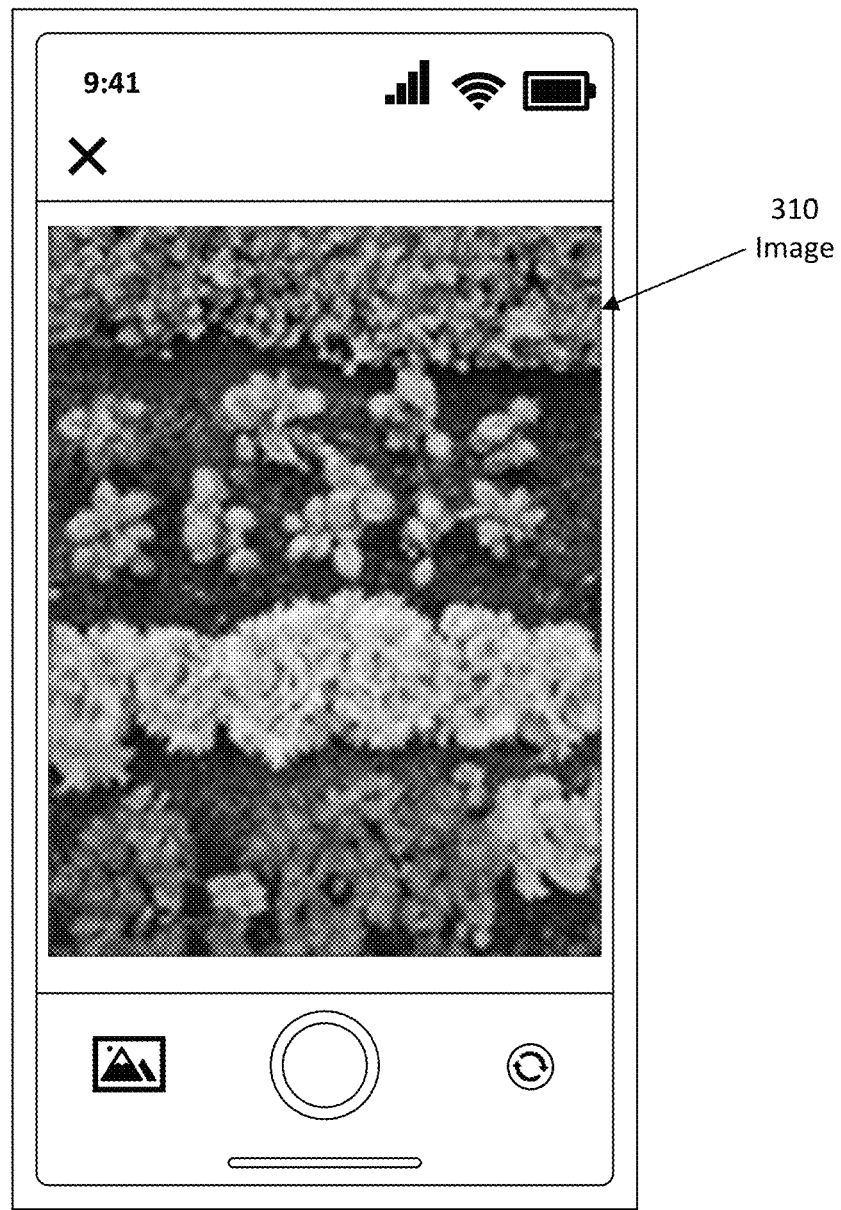
FIG. 3A illustrates an example view of an image on which a user can input a contextual prompt.

FIG. 3A illustrates an example view of an image on which a user can provide a contextual prompt.

FIG. 3A shows an example view 300a of an image 310, on which a user can provide a contextual prompt. Image 310 depicts a garden of various kinds of herbs. Image 310 is displayed to a user via a GUI on a user device 140, for example, as described with reference to step 210 of method 200.

FIGS. 3B, 3C, 3D, 3E, and 3F show example views of images with user contextual prompts provided on image 310.

Figure 3B:
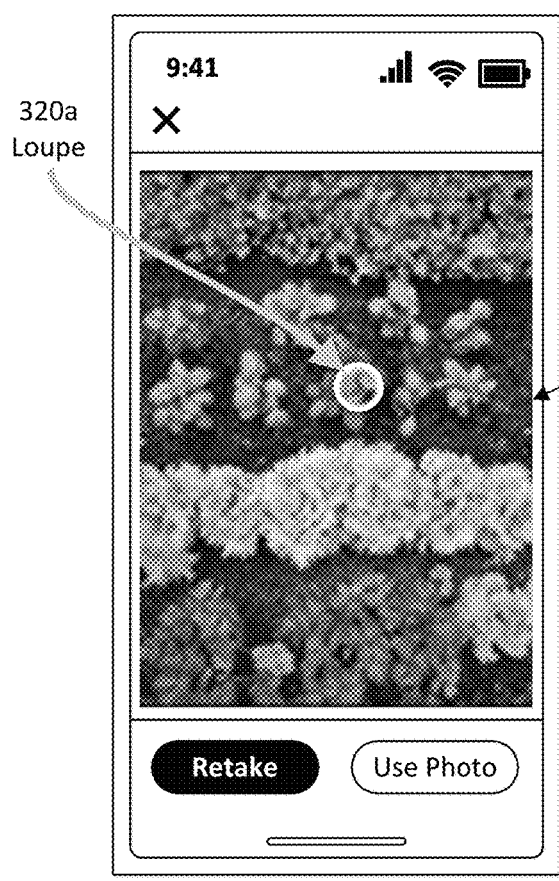

FIG. 3B shows an example view 300b of a contextual prompt 320a applied to a particular area of image 310. Image 310 is displayed to a user via a GUI on a user device 140, as for example, described in step 210 of method 200. In the scenario of FIG. 3B, contextual prompt 320a inputted by the user comprises an annotation generated using an annotation tool of the GUI received by the at least one processor as, for example, described in step 220 of method 200. In the case of 300b, the contextual prompt 320a is in the form of a loupe annotation generated, for example, by the user using an annotation tool of the GUI. Contextual prompt 320a encompasses the size of two leaves of a particular plant in image 310. The machine learning model, such as a multimodal LLM, of machine learning system 130 can provide a textual response conditioned on the contextual prompt of the user by utilizing semantic segmentation and prompt engineering, as for example, described with reference to steps 230 and 240 of method 200.

For the scenario of FIG. 3B, the input data of step 230 of method 200 may comprise concatenated tokenizations of image 310 and contextual prompt 320a. For example, image 310 may be tokenized into ROIs identifying the various herbs within the garden in image 310, such as the leaves encompassed by the contextual prompt 320a, which may be tokenized based on coordinates with respect to the image. For example, contextual prompt 320a may be tokenized into patches that comprise only the part of image 310 encompassed by contextual prompt 320*a*. In some embodiments, the concatenated tokenization may include a series of sections of the image. The input data may additionally include tokenized image characteristics and/or metadata including for example image size, image format, image color, coordinates of the user selection, image context description, edge information, among others.

For the scenario of FIG. 3B, the textual response of step 240 of method 200 may include an output that is based on the recognized element on the selected image. For example, in scenario of FIG. 3B the textual response may include a recipe using basil, how to grow basil, other things to do with basil, the type of object being selected. For example, as the textual response may include "this plant is a basil plant."

Figure 3C:
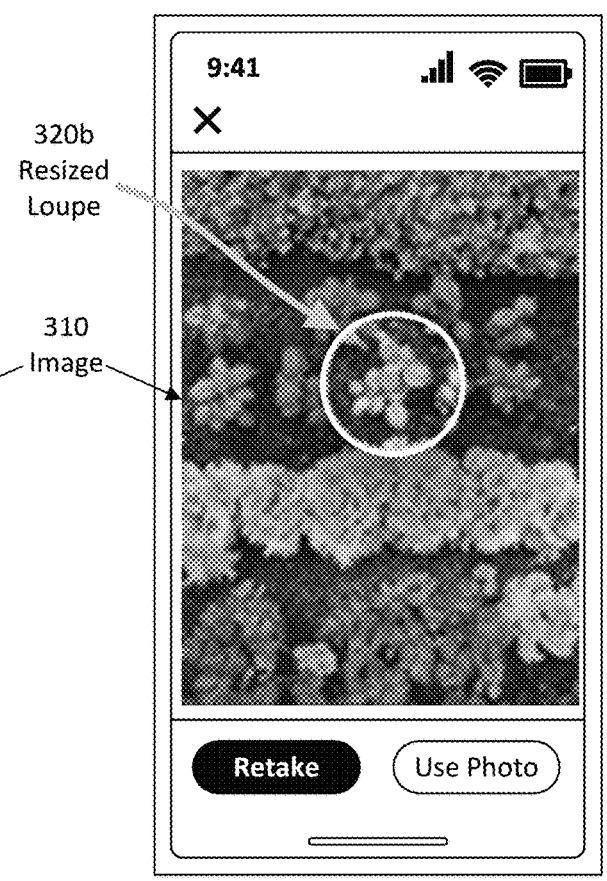

FIG. 3C shows another example view 300*c* of a contextual prompt 320*b* applied to a particular area of image 310. As for example described with reference to step 210 of method 200, image 310 is displayed to a user via a GUI on a user device 140. In the scenario of FIG. 3C, the contextual prompt 320*b* received by the at least one processor, as for example, described in step 220 of method 200, is a loupe resized from the original size depicted in view 300*b* with loupe 320*a*. For example, an annotation tool within the GUI allows the user to resize any applied annotations on an image. This resized loupe 320*b* draws attention to a much larger area of the image than original loupe 320*a*. In example view 300*b*, the loupe 320*a* encompasses the size of only two leaves of a particular plant, but in example view 300*c* the resized loupe 320*b* now encompasses the size of the whole plant itself. The machine learning model, such as a multimodal LLM, can now provide a response focusing on the whole plant in resized loupe 320*b*, rather than just the two leaves in original loupe 320*a*. The model can do this by using, for example, semantic segmentation and prompt engineering, as for example, described with reference to steps 230 and 240 of method 200.

For the scenario of FIG. 3C, the input data of step 230 of method 200 may comprise concatenated tokenizations of image 310 and contextual prompt 320*b*. For example, image 310 may be tokenized into ROIs identifying the various herbs within the garden in image 310, such as the plant encompassed by the contextual prompt 320*b*, which may be tokenized based on coordinates with respect to the image. For example, contextual prompt 320*b* may be tokenized into patches that comprise only the part of image 310 encompassed by contextual prompt 320*b*. In some embodiments, the concatenated tokenization may include a series of sections of the image. The input data may additionally include tokenized image characteristics and/or metadata including for example image size, image format, image color, coordinates of the user selection, image context description, edge information, among others.

For the scenario of FIG. 3C, the textual response of step 240 of method 200 may include an output that is based on the recognized element on the selected image. For example, in scenario of FIG. 3C the textual response may include a recipe using basil, how to grow basil, other things to do with basil, the type of object being selected. For example, as the textual response may include "this plant is a basil plant."

FIG. 3D shows another example view 300*d* of a contextual prompt 330*a* applied to a particular area of image 310. As for example described with reference to step 210 of method 200, image 310 is displayed to a user via a GUI on a user device 140. Contextual prompt 330*a* is received by the at least one processor, as for example, described in step 220 of method 200. In the scenario of FIG. 3D, the contextual prompt 330*a* of the user is in the form of a mark, drawn using an annotation tool of the GUI. In the case of 300*d*, mark 330*a* is in the form of a crudely drawn cross. The machine learning model, such as a multimodal LLM, can now provide a textual response focusing on the area of the image as indicated by the prompt 330*a*. The model can do this by using, for example, semantic segmentation and prompt engineering, as for example, described with reference to steps 230 and 240.

For the scenario of FIG. 3D, the input data of step 230 of method 200 may comprise concatenated tokenizations of image 310 and contextual prompt 330*a*. For example, image 310 may be tokenized into ROIs identifying the various herbs within the garden in image 310, such as the plant indicated by the contextual prompt 330*a*, which may be tokenized based on coordinates with respect to the image. For example, contextual prompt 330*a* may be tokenized into patches that comprise only the part of image 310 indicated by contextual prompt 330*a*. In some embodiments, the concatenated tokenization may include a series of sections of the image. The input data may additionally include tokenized image characteristics and/or metadata including for example image size, image format, image color, coordinates of the user selection, image context description, edge information, among others.

For the scenario of FIG. 3D, the textual response of step 240 of method 200 may include an output that is based on the recognized element on the selected image. For example, in scenario of FIG. 3D the textual response may include a recipe using basil, how to grow basil, other things to do with basil, the type of object being selected. For example, as the textual response may include "this plant is a basil plant."

FIG. 3E depicts another example view 300*e* of a contextual prompt 330*b* applied to a particular area of image 310. As for example described with reference to step 210 of method 200, image 310 is displayed to a user via a GUI on a user device 140. Contextual prompt 330*b* is received by the at least one processor, as for example, described in step 220 of method 200. In the scenario of FIG. 3E, the contextual prompt 330*b* is again in the form of a mark, drawn using an annotation tool of the GUI. In the case of 300*e*, contextual prompt 330*b* is in the form of a differently shaped mark than 330a of FIG. 3D. In the case of 300*e*, mark 330*b* is in the form of a crudely drawn unclosed loop. Despite mark 330*b* not being a closed loop, the model is still able to provide a response focusing on the area of the image mark 330*b* is predominantly drawn over. The machine learning model, such as a multimodal LLM, can now provide a textual response focusing on the area of the image as indicated by the prompt 330*b*. The model can do this by using, for example, semantic segmentation and prompt engineering, as for example, described with reference to steps 230 and 240.

For the scenario of FIG. 3E, the input data of step 230 of method 200 may comprise concatenated tokenizations of image 310 and contextual prompt 330*b*. For example, image 310 may be tokenized into ROIs identifying the various herbs within the garden in image 310, such as the leaves encompassed by the contextual prompt 330*b*, which may be tokenized based on coordinates with respect to the image. For example, contextual prompt 330*b* may be tokenized into patches that comprise only the part of image 310 encompassed by contextual prompt 330*b*. In some embodiments, the concatenated tokenization may include a series of sections of the image. The input data may additionally include tokenized image characteristics and/or metadata including for example image size, image format, image color, coordinates of the user selection, image context description, edge information, among others.

For the scenario of FIG. 3E, the textual response of step 240 of method 200 may include an output that is based on the recognized element on the selected image. For example, in scenario of FIG. 3E the textual response may include a recipe using basil, how to grow basil, other things to do with basil, the type of object being selected. For example, as the textual response may include "this plant is a basil plant."

Figure 3F:
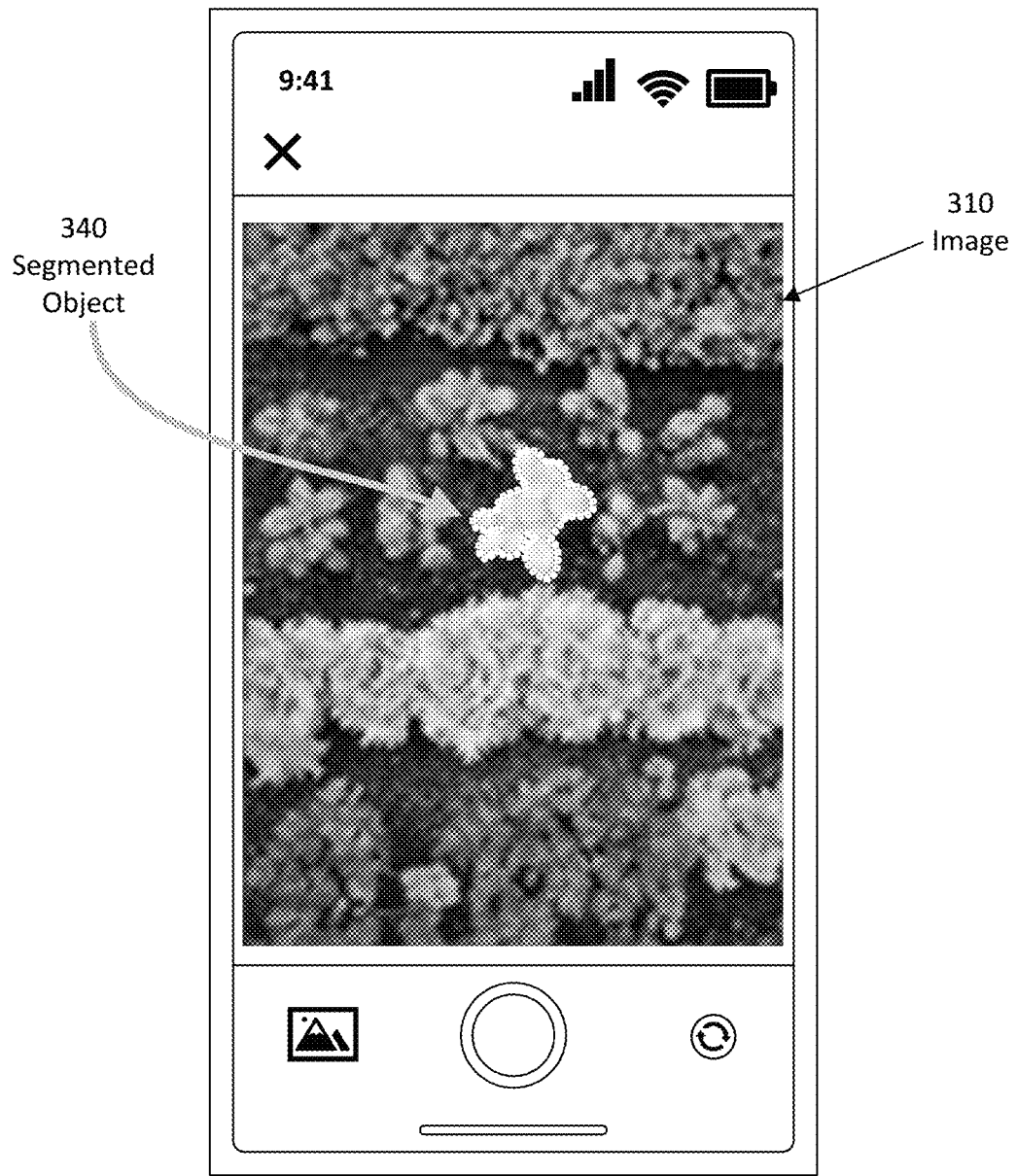

FIG. 3F shows an example view 300f of image 310 with applied contextual prompt 340. Image 310 is displayed to a user via a GUI on a user device 140, as for example, described with reference to step 210 of method 200. Contextual prompt 340 is received by the at least one processor, as for example, described in step 220 of method 200. In the case of 300f, contextual prompt 340 is in the form of a segmented object within the image. In some embodiments, a user can use an annotation tool of the GUI to select an object within an image for segmentation. For example, the at least one processor can image 310 to image processing system 120 of system 100 in order to generate a segmentation mask conditioned on the object selected by the user for segmentation. In the case of FIG. 3F, the segmented object 340 is one of the plants in image 310. The machine learning model, such as a multimodal LLM, can now provide a textual response focusing on the area of the image as indicated by the prompt 340. The model can do this by using, for example, semantic segmentation and prompt engineering, as for example, described with reference to steps 230 and 240.

For the scenario of FIG. 3F, the input data of step 230 of method 200 may comprise concatenated tokenizations of image 310 and contextual prompt 340. For example, image 310 may be tokenized into ROIs identifying the various herbs within the garden in image 310, such as the plant indicated by the contextual prompt 340, which may be tokenized based on coordinates with respect to the image. For example, contextual prompt 340 may be tokenized into patches that comprise only the part of image 310 indicated by contextual prompt 340. In some embodiments, the concatenated tokenization may include a series of sections of the image. The input data may additionally include tokenized image characteristics and/or metadata including for example image size, image format, image color, coordinates of the user selection, image context description, edge information, among others.

For the scenario of FIG. 3F, the textual response of step 240 of method 200 may include an output that is based on the recognized element on the selected image. For example, in scenario of FIG. 3F the textual response may include a recipe using basil, how to grow basil, other things to do with basil, the type of object being selected. For example, as the textual response may include "this plant is a basil plant."

Figure 4:
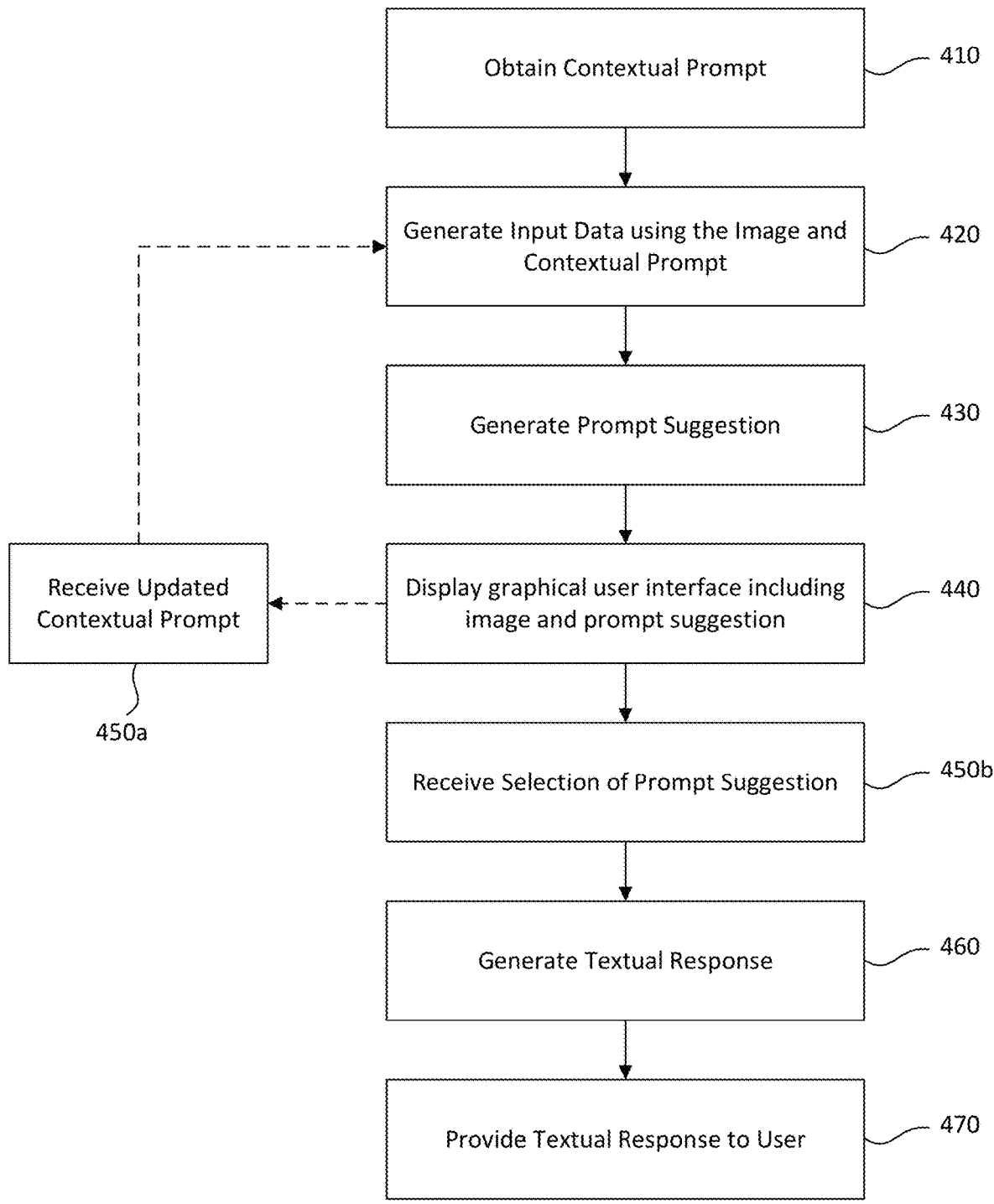
FIG. 4 illustrates another exemplary method for interacting with a machine learning model such as a multimodal LLM, according to some embodiments of the present disclosure.

FIG. 4 depicts another exemplary method 400 for interacting with a machine learning model such as a multimodal LLM, according to some embodiments of the present disclosure.

As with method 200, method 400 can be performed (e.g., executed) by a system supporting the use of machine learning models, such as system 100 of FIG. 1, or any computing device. In some embodiments, method 400 can be implemented using at least one processor (e.g., processor 706 in FIG. 7), which may execute one or more instructions stored in memory, such as on a computer-readable medium (e.g., data storage device 708 in FIG. 7). For ease of explanation, steps of method 400 are described as being performed by the at least one processor; however, other components or devices could be used additionally or instead as appropriate. While the steps in FIG. 4 are shown in a particular exemplary order, it is appreciated that the individual steps may be reordered, omitted, and/or repeated. Steps described in method 400 may include performing operation described in the present disclosure with reference to FIGS. 1 to 3, 5, and 6. Method 400 can also be performed as part of another process or method, such as method 200.

In some embodiments, method 400 may begin at step 410. At step 410, shown in FIG. 4, the at least one processor obtains a contextual prompt. This contextual prompt can be obtained from the user via a GUI on user device 140. For example, the at least one processor can cause the GUI to be displayed to the user on user device 140. In some embodiments, the GUI displays an image to a user and is configured to enable a user to interact with the image in order to generate a contextual prompt that indicates an area of emphasis within the image.

In some embodiments, the image displayed to the user may be selected by the at least one processor or the machine learning model. The at least one processor or the machine learning model may select the image randomly, or at the request of the user, for example, given a specific prompt, from pre-stored images or images obtained from elsewhere such as, for example, from a source found on the Internet. In some embodiments the image may be uploaded by the user or downloaded by the user from another source. In some embodiments, the image may be generated by the machine learning model. The machine learning model may generate the image randomly, or at a request of the user, for example, given a specific prompt. In some embodiments, the image is a current screen shot of the GUI state shown to the user. The image may also be obtained in an alternative way to the preceding examples.

In some embodiments, receiving the contextual prompt can comprise detecting a user human interface device interaction. In some embodiments, the user human interface device interaction can include a mouse click, a touchscreen press, and other such interactions.

A contextual prompt may be, but not limited to, an indication of an area or region of emphasis or focus within an image on the GUI. In some embodiments, the contextual prompt is in the form of an annotation of an annotation tool in the GUI. In some embodiments, the contextual prompt is in the form of a click input by the user on user device 140 via a peripheral device such as a computer mouse. In some embodiments, the contextual prompt can indicate an object depicted within an image. In some embodiments, the GUI enables the user to resize an area of effect of the annotation tool, in order to focus the model on a bigger or smaller area of an image. In some embodiments, the annotation tool can comprise a loupe annotation, a marker, a segmentation tool, or any other such means of annotation. In some embodiments, a mark can be of any shape chosen by the user.

In some embodiments, a segmentation tool of an annotation tool allows a user to choose an area of emphasis within an image via a user human interface device interaction, for example, in order to isolate it from the rest of an image.

At step 420, the at least one processor generates input data using an image and the contextual prompt. In some embodiments, the input data is generated in the form that could be applied to the machine learning model, such as a multimodal LLM, and provide such a model with information necessary to complete the request defined by the contextual prompt. For example, if the machine learning model is a transformer type model, generating the input data can comprise the at least one processor tokenizing both the image and contextual prompt of the user into separate sequences of tokens. Tokenization refers to the splitting of an input into discrete parts than can subsequently be embedded into a vector space, allowing the input to be passed into the machine learning model.

The type of tokenization is dependent on the modality of the input. In some embodiments, tokenization of the image and contextual prompt can be in the form of one or more of patches, region-of-interest (RoI), or any other type of tokenization suitable for images.

In some embodiments, after tokenization of both the contextual prompt and the image, the at least one processor can concatenate the tokenized contextual prompt and the tokenized image to form a singular tokenized input for embedding into a vector space.

In some embodiments, the at least one processor can generate an embedding of the concatenated tokenized input into a vector space using one or more of a convolutional neural network (CNN), a linear projection, a learned embedding, a graph neural network (GNN), or any other type of suitable embedding process.

In some embodiments, generating the input data using the image and the contextual prompt comprises generating a segmentation mask and generating the input using the image and the segmentation mask. In some embodiments, the segmentation mask is generated by the at least one processor providing the image and contextual prompt to a segmentation model of image processing system 120.

In some embodiments, generating the input data can comprise generating an updated image based on the user contextual prompt and then generating the input data using the updated image. In some embodiments, generating the input data using the image and user contextual prompt comprises generating a textual prompt or token using the contextual prompt and then generating the input data using the image and the textual prompt or token, wherein the textual prompt or token indicates at least one set of coordinates of a location within the image, as indicated by the contextual prompt of the user. A token can be a sequence of characters that represents a meaningful unit of text, such as a word, a punctuation mark, a number, or any other symbol that has a semantic or syntactic role in the text.

In some embodiments, the machine learning model of machine learning system 130 generates a textual prompt or token using the contextual prompt by utilizing a segmentation model of image processing system 120, configured to perform semantic segmentation. Semantic segmentation is a deep learning algorithm that assigns a class label to every pixel within an image. For example, a segmentation model of image processing system 120 can be configured to recognize certain objects within an image, such as but not limited to, human beings, animals, inanimate objects etc., and then machine learning model can generate a textual prompt or token using the identified objects.

At step 430, at least one prompt suggestion is generated, for example, by the model utilizing semantic segmentation and prompt engineering. The at least one prompt suggestion is conditioned on the image and contextual prompt. For example, the image can be applied to image processing system 120, configured to perform semantic segmentation, and the model can use the results of the semantic segmentation in combination with prompt engineering to suggest to the user suitable prompt suggestions.

In some embodiments, at least one prompt suggestion is generated and conditioned on the image itself if no contextual prompt is received. In some embodiments, the at least one prompt suggestion can be a textual prompt relating to the image and the contextual prompt chosen by the user.

At step 440, the GUI is displayed to the user via user device 140 and includes both the image and at least one prompt suggestion. In some embodiments, the at least one prompt suggestion is displayed to the user, for example, within a text box of the GUI. For example, the user in an ongoing textual chat with the model within the GUI, may be shown the at least one prompt suggestion as part of the textual chat. In some embodiments, the at least one prompt suggestion is displayed to the user within a separate text box of the GUI. In some embodiments, the at least one prompt suggestion is displayed when the user manipulates a cursor of the GUI to a particular area within the GUI. For example, a user may manipulate a cursor of the GUI to a button or other element within the GUI in order to view the at least one prompt suggestion.

As shown in FIG. 4, after step 440 method 400 may continue to step 450a or step 450b. If the at least one processor determines that an updated contextual prompt has been received, method 400 may continue to step 450a. For example, if the user provides a new contextual prompt such as, for example, described in relation to the contextual prompt of step 410, the at least one processor can determine whether or not the updated contextual prompt is different to that of the original contextual prompt obtained in step 410.

At step 450a, an updated contextual prompt is received. If an updated contextual prompt is received, the following step of the method is a return to step 420, in which input data is again generated using the image and the updated contextual prompt.

If no updated contextual prompt is received, method 400 continues from step 440 to step 450b. At 450b, the at least one processor receives the selection of at least one prompt suggestion. In some embodiments, the GUI can provide a selectable control configured to enable the user to select at least one prompt suggestion from the at least one prompt suggestion generated in step 430. In some embodiments, the input data applied to the machine learning model is further generated using the textual prompt selected by the user from the at least one prompt suggestion.

At step 460, an output in the form of a textual response is generated. In some embodiments, the at least one processor generates an output by applying the input data to the machine learning model. The machine learning model, such as a multimodal LLM, of machine learning system 130 is configured to condition its textual response to the image based on the contextual prompt. For example, in some embodiments, when the contextual prompt indicates an object depicted within the image, the textual prompt also concerns the depicted object. In some embodiments, the machine learning model is configured to use prompt engineering to generate a textual response, for example, as described with reference to step 240 of method 200.

At step 470, the textual response is provided to the user. For example, the at least one processor displays the textual response to the user via a GUI on user device 140.

In some embodiments, method 400 can be performed without the generation of at least one prompt suggestion at step 430 and without receiving the selection of the at least one prompt suggestion at step 450b. In some embodiments, the GUI displayed at step 440 includes the image and a textual prompt input interface at which a textual prompt inputted by the user via user device 140 can be received. In some embodiments, the input data is further generated using the textual prompt, and the model is configured to further condition the textual response generated at step 460 to the image, based on the textual prompt.

In some embodiments, the textual response comprises at least one prompt suggestion. In some embodiments, providing the textual response comprises displaying a selectable control in the GUI configured to enable the user to select the prompt suggestion. In further embodiments, the method further comprises, in response to selection of the control by the user, generating second input data using the prompt suggestion and the image, generating a second response by applying the second input data to the model, and providing the second response to the user.

Figure 5A:
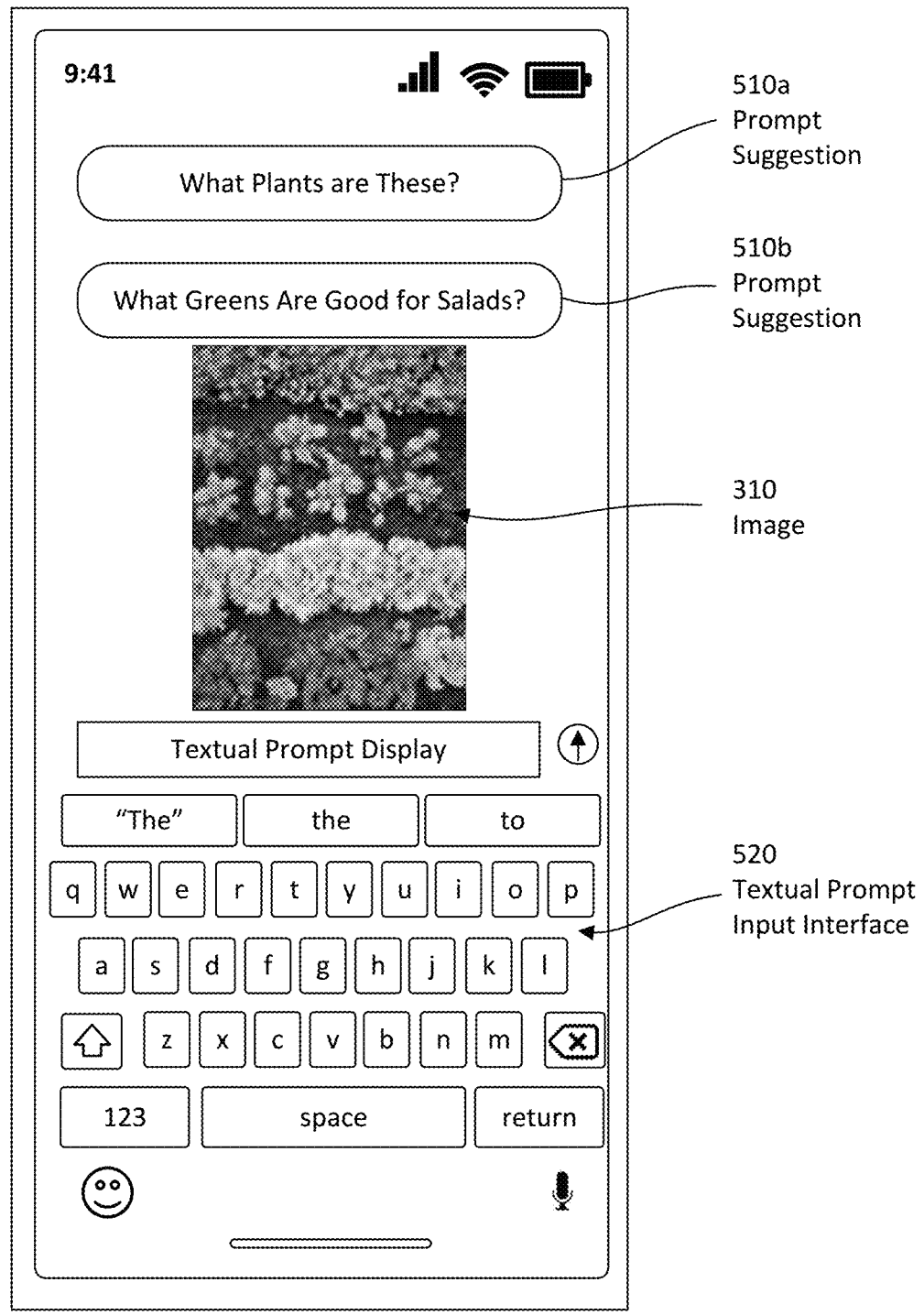
FIGS. 5A and 5B illustrate example views of images with user textual prompt suggestions dependent on the presence of user contextual prompts, according to some embodiments of the present disclosure.
Figure 5B:
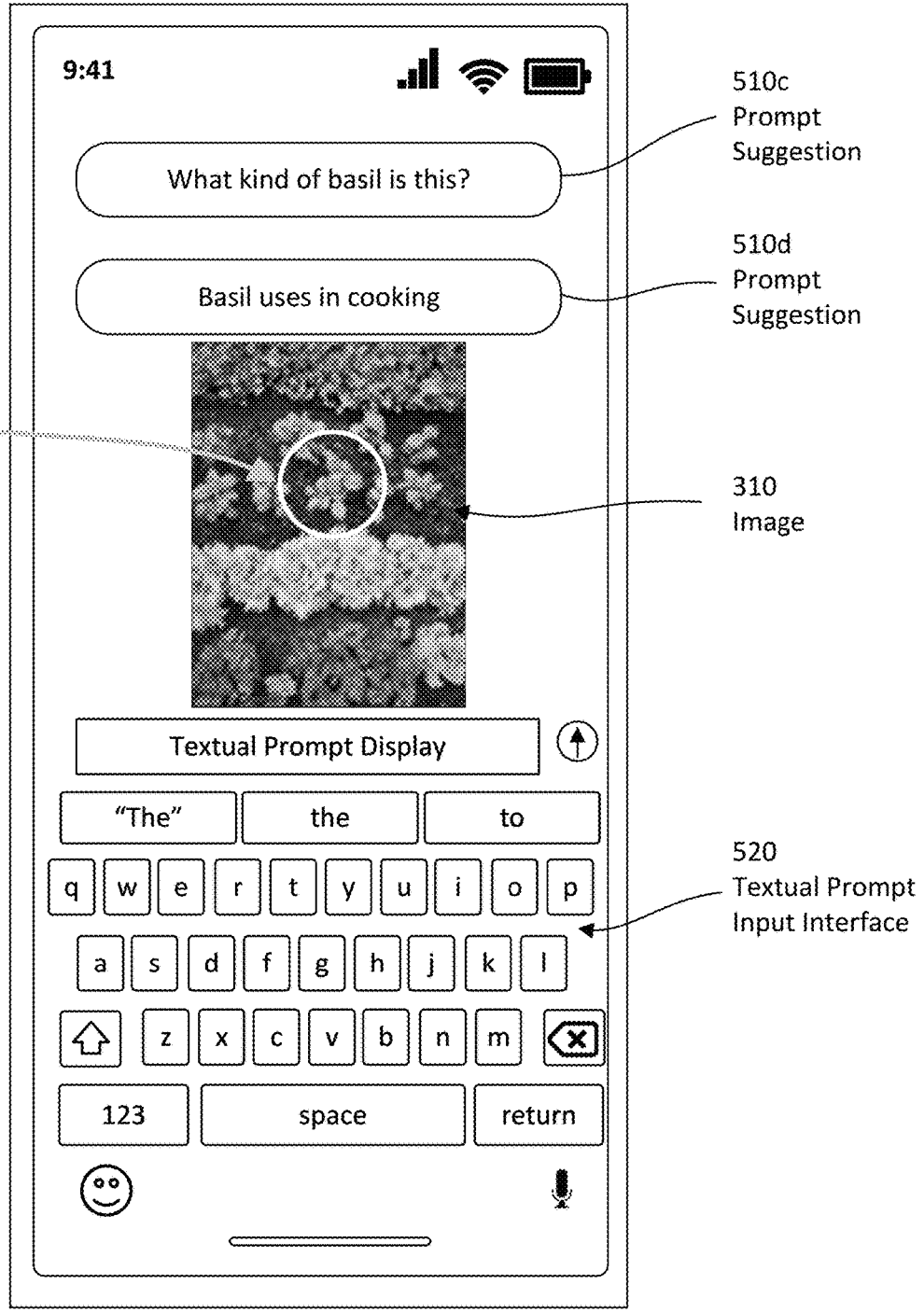

FIGS. 5A and 5B show example views of prompt suggestions for image 310.

FIG. 5A depicts exemplary view 500a in which image 310 is displayed to a user via a GUI on a user device 140, as for example, described with reference to step 210 of method 200. The GUI also displays prompt suggestions 510a and 510b. Prompt suggestions 510a and 510b are generated, for example, as described with reference to step 430 of method 400. Item 520 is an example interface of the GUI which a user can use to input a textual prompt. Textual prompt input interface 520 allows a user to type in a particular prompt, rather than using the suggestions 510a and 510b provided. Prompt suggestions 510a and 510b relate to image 310 as a whole as no contextual prompt has been applied to the image.

FIG. 5B depicts exemplary view 500b in which image 310 is displayed on a GUI with prompt suggestions 510c and 510d. Image 310 is displayed to a user via a GUI on a user device 140, as for example, as described in step 210 of method 200. In FIG. 5B, contextual prompt 320b is received by the at least one processor, as for example, as described in step 220 of method 200. Contextual prompt 320b is in the form of a resized loupe. As a result of applying a contextual prompt, prompt suggestions 510c and 510d are generated, as for example, described in step 430 of method 400. Prompt suggestions 510c and 510d are conditioned to the basil herb encompassed by the resized loupe 320b in image 310, and thus read, respectively, "What kind of basil is this?" and "Basil uses in cooking".

Figure 6A:
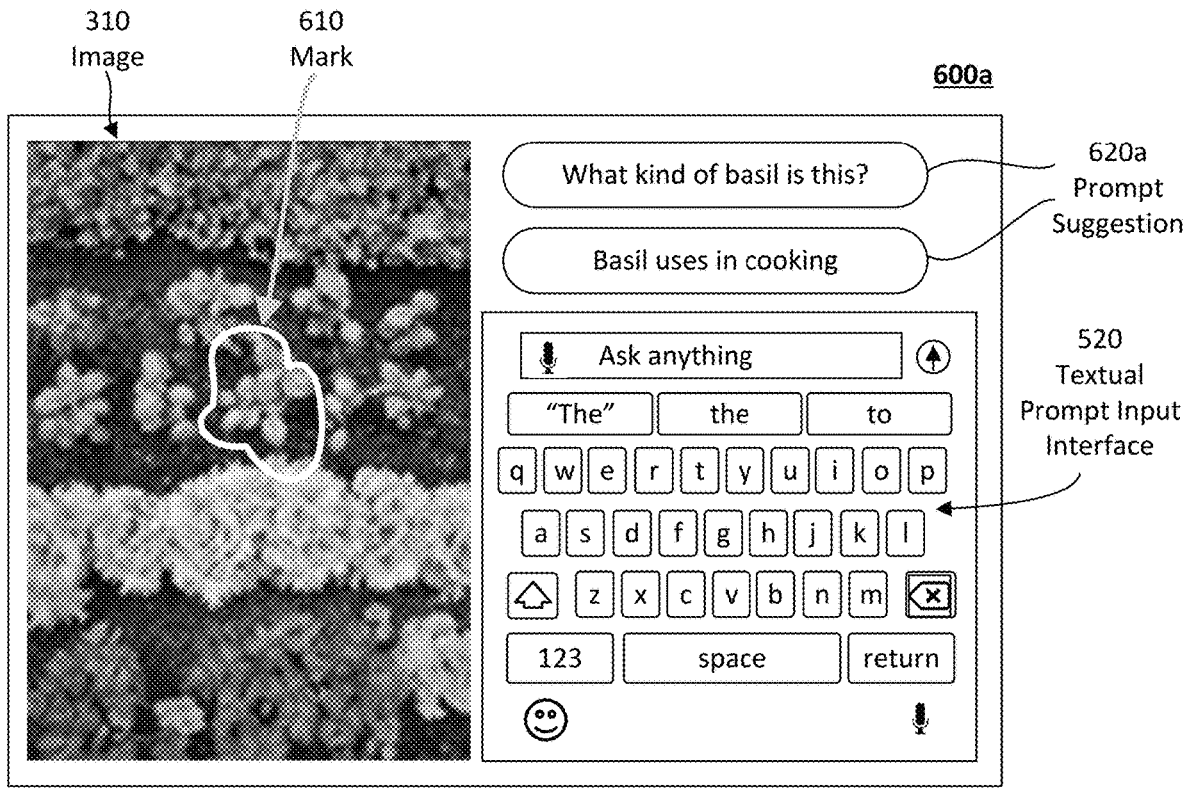
FIGS. 6A and 6B illustrate example views of images with user textual prompt suggestions dependent on the location of user contextual prompts, according to some embodiments of the present disclosure.
Figure 6B:
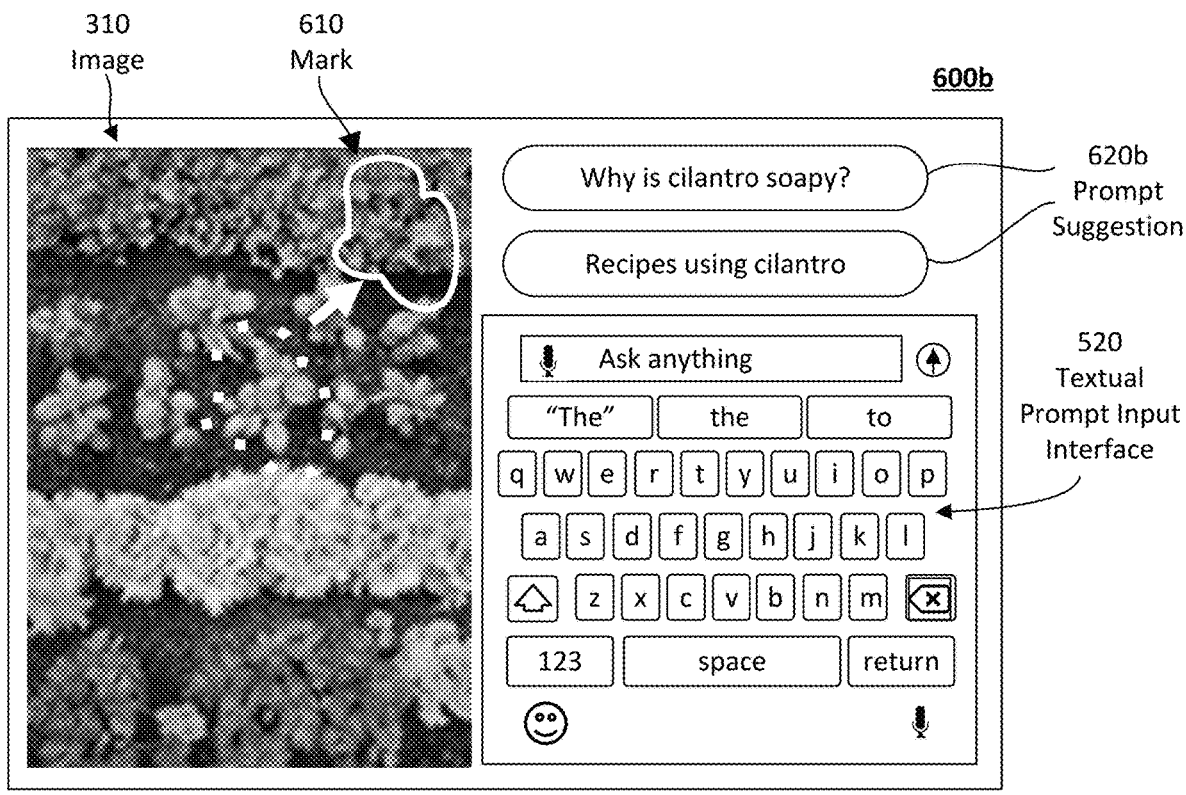

FIGS. 6A and 6B show example views showing how prompt suggestions are dependent on the location of the user contextual prompt.

In FIG. 6A, example view 600a shows image 310 with contextual prompt 610 at a certain location. Image 310 is displayed to a user via a GUI on a user device 140, for example, as described in step 210 of method 200. Contextual prompt 610 is applied to the image 310 by the user, for example, as described in step 220 of method 200. Contextual prompt 610 is in the form of a mark crudely drawn by the user. In the case of FIG. 6A, the model has successfully identified the herb enclosed within the mark 610 as basil, and subsequently prompt suggestions 620a reflect this by suggesting possible prompt suggestions conditioned on the mark, "What kind of basil is this?" and "Basil uses in cooking", as for example, described in step 420 od method 400.

In FIG. 6B, example view 600b shows image 310 with contextual prompt 610 at a different location. Image 310 is displayed to a user via a GUI on a user device 140, for example, as described in step 210 of method 200. Contextual prompt 610 is the same as that of FIG. 6A but moved by the user to a different location within image 310. In the case of FIG. 6B, the model has successfully identified the new herb enclosed within the mark 610 as cilantro, and subsequently new prompt suggestions 620b appear. Prompt suggestions 620b are generated, as for example, described with reference to step 430 of method 400. The new prompt suggestions 620b reflect the change in location of mark 610 by now suggesting "Why is cilantro soapy?" and "Recipes using cilantro" as possible user textual prompts.

Figure 7:
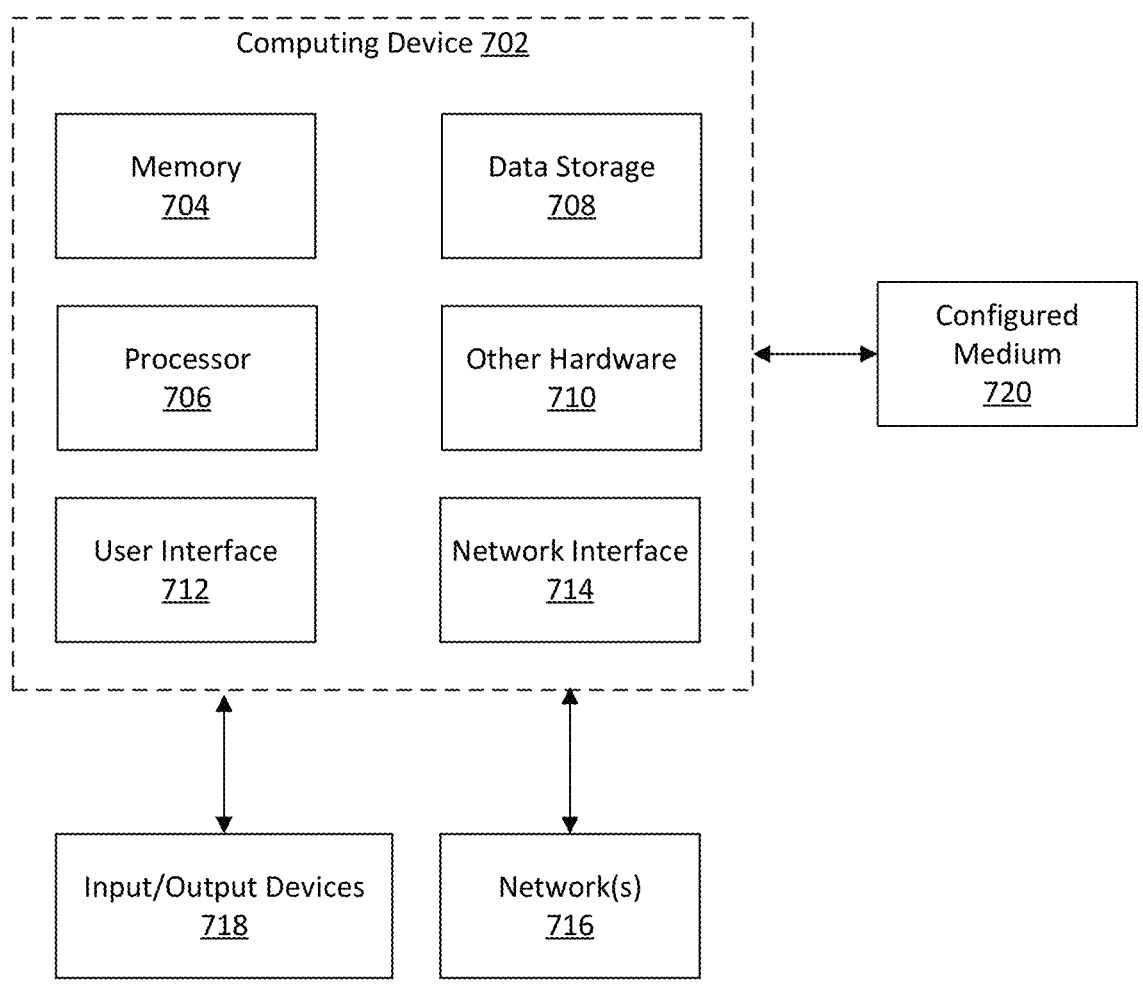
FIG. 7 is a block diagram illustrating an exemplary operating environment for implementing various aspects of this disclosure, according to some embodiments of the present disclosure.

FIG. 7 is a block diagram illustrating an exemplary operating environment for implementing various aspects of this disclosure, according to some embodiments of the present disclosure.

An exemplary operating environment for implementing various aspects of this disclosure is illustrated in FIG. 7. As illustrated in FIG. 7, an exemplary operating environment 700 may include a computing device 702 (e.g., a general-purpose computing device) in the form of a computer. In some embodiments, computing device 702 may be associated with a user. Components of the computing device 702 may include, but are not limited to, various hardware components, such as one or more processors 706, data storage 708, a system memory 704, other hardware 710, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 7, an operating environment 700 for an exemplary embodiment includes at least one computing device 702. The computing device 702 may be a uniprocessor or multiprocessor computing device. An operating environment 700 may include one or more computing devices (e.g., multiple computing devices 702) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 702 may be configured for end-users, e.g., with applications, for administrators, as a server, as a distributed processing node, as a special-purpose processing device, or otherwise configured to train machine learning models and/or use machine learning models.

One or more users may interact with the computer system comprising one or more computing devices 702 by using a display, keyboard, mouse, microphone, touchpad, camera, sensor (e.g., touch sensor) and other input/output devices 718, via typed text, touch, voice, movement, computer vision, gestures, and/or other forms of input/output. An input/output device 718 may be removable (e.g., a connectable mouse or keyboard) or may be an integral part of the computing device 702 (e.g., a touchscreen, a built-in microphone). A user interface 712 may support interaction between an embodiment and one or more users. A user interface 712 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 718 and computing device 702, based on input received from at user interface 712 and/or from network(s) 716. As used throughout, "based on" may refer to being established or founded upon a use of, changed by, influenced by, caused by, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 702 in other embodiments, depending on their detachability from the processor(s) 706. Other computerized devices and/or systems not shown in FIG. 1 may interact in technological ways with computing device 702 or with another system using one or more connections to a network 716 via a network interface 714, which may include network interface equipment, such as a physical network interface controller (NIC) or a virtual network interface (VIF).

Computing device 702 includes at least one logical processor 706. The computing device 702, like other suitable devices, also includes one or more computer-readable storage media, which may include, but are not limited to, memory 704 and data storage 708. In some embodiments, memory 704 and data storage 708 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 720 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 702, making its content accessible for interaction with and use by processor(s) 706. The removable configured medium 720 is an example of a computer-readable storage medium. Some other examples of computer-readable storage media include built-in random access memory (RAM), read-only memory (ROM), hard disks, and other memory storage devices which are not readily removable by users (e.g., memory 704).

The configured medium 720 may be configured with instructions (e.g., binary instructions) that are executable by a processor 706; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 720 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 710 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 706 (e.g., one or more CPUs, ALUs, FPUs, and/or GPUs), memory 704, data storage 708, and screens/displays, an operating environment 700 may also include other hardware 710, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 718 such as human user input/output devices (screen, keyboard, mouse, tablet, microphone, speaker, motion sensor, etc.) will be present in operable communication with one or more processors 706 and memory.

In some embodiments, the system includes multiple computing devices 702 connected by network(s) 716. Networking interface equipment can provide access to network(s) 716, using components (which may be part of a network interface 714) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 702 may operate in a networked or cloud-computing environment using logical connections to one or more remote devices (e.g., using network(s) 716), such as a remote computer (e.g., another computing device 702). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 702 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

The computing device 702 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 708 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 708 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 7, an operating environment 700 may include at least one computing device 702, the at least one computing device 702 including at least one processor 706, at least one memory 704, at least one data storage 708, and/or any other component discussed below, such as with respect to FIG. 7.

Figure 8:
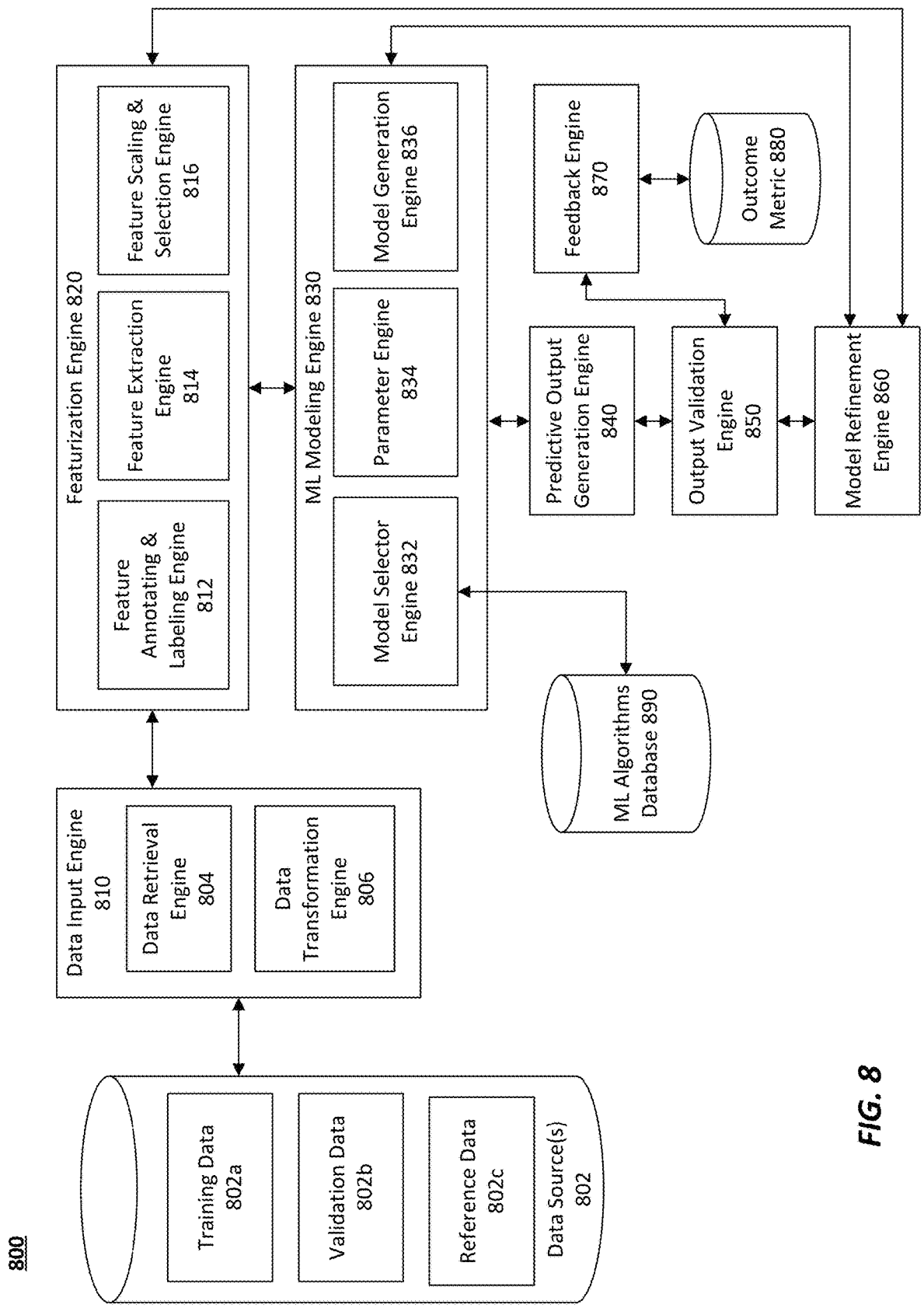
FIG. 8 is a block diagram illustrating an exemplary machine learning platform for implementing various aspects of this disclosure, according to some embodiments of the present disclosure.

FIG. 8 is a block diagram illustrating an exemplary machine learning platform for implementing various aspects of this disclosure, according to some embodiments of the present disclosure.

System 800 may include data input engine 810 that can further include data retrieval engine 804 and data transform engine 806. Data input engine 810 may be configured to access, interpret, request, format, re-format, or receive input data from data source(s) 802. Data source(s) 802 may include one or more of training data 802*a* (e.g., input data to feed a machine learning model as part of one or more training processes), validation data 802*b* (e.g., data against which at least one processor may compare model output with, such as to determine model output quality), and/or reference data 802*c*. In some embodiments, data input engine 810 can be implemented using at least one computing device (e.g., computing device 702). For example, data from data sources 802 can be obtained through one or more I/O devices and/or network interfaces. Further, the data may be stored (e.g., during execution of one or more operations) in a suitable storage or system memory. Data input engine 810 may also be configured to interact with data storage 708, which may be implemented on a computing device that stores data in storage or system memory. System 800 may include featurization engine 820.

Featurization engine 820 may include feature annotating & labeling engine 812 (e.g., configured to annotate or label features from a model or data, which may be extracted by feature extraction engine 814), feature extraction engine 814 (e.g., configured to extract one or more features from a model or data), and/or feature scaling and selection engine 816. System 800 may also include machine learning (ML) modeling engine 830, which may be configured to execute one or more operations on a machine learning model (e.g., model training, model re-configuration, model validation, model testing), such as those described in the processes described herein. For example, ML modeling engine 830 may execute an operation to train a machine learning model, such as adding, removing, or modifying a model parameter. Training of a machine learning model may be supervised, semi-supervised, or unsupervised. Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic.

ML modeling engine 830 may include model selector engine 832 (e.g., configured to select a model from among a plurality of models, such as based on input data), parameter selector engine 834 (e.g., configured to add, remove, and/or change one or more parameters of a model), and/or model generation engine 836 (e.g., configured to generate one or more machine learning models, such as according to model input data, model output data, comparison data, and/or validation data). Similar to data input engine 810, featurization engine 820 can be implemented on a computing device. In some embodiments, model selector engine 832 may be configured to receive input and/or transmit output to ML algorithms database 890 (e.g., a data storage 708). Similarly, featurization engine 820 can utilize storage or system memory for storing data and can utilize one or more I/O devices or network interfaces for transmitting or receiving data. ML algorithms database 890 (or other data storage 708) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model, a linear regression model, a k-means clustering model, a Q-Learning model, a Temporal Difference (TD) model, a Deep Adversarial Network model, or any other type of model described further herein.

System 800 can further include predictive output generation engine 840, output validation engine 850 (e.g., configured to apply validation data to machine learning model output), feedback engine 870 (e.g., configured to apply feedback from a user and/or machine to a model), and model refinement engine 860 (e.g., configured to update or re-configure a model). In some embodiments, feedback engine 870 may receive input and/or transmit output to outcome metrics database 880. In some embodiments, model refinement engine 860 may receive output from predictive output generation engine 840 or output validation engine 850. In some embodiments, model refinement engine 860 may transmit the received output to featurization engine 820 or ML modeling engine 830 in one or more iterative cycles.

Any or each engine of system 800 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 800 may be split across multiple computing devices to allow for distributed processing of the data, which may improve output speed and reduce computational load on individual devices. In these or other embodiments, the different components may communicate over one or more I/O devices and/or network interfaces.

System 800 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method of interacting with a pre-trained multimodal machine learning model, the method comprising:
providing a graphical user interface configured to enable a user to interact with an image to generate a contextual prompt that indicates an area of emphasis in the image;
receiving the contextual prompt;
generating input data using the image and the contextual prompt;
generating a textual response to the image by applying the input data to a multimodal machine learning model configured to condition the textual response to the image on the contextual prompt; and
providing the textual response to the user,
wherein the textual response comprises a prompt suggestion and providing the textual response comprises displaying a selectable control in the graphical user interface configured to enable the user to select the prompt suggestion.

2. The method of claim 1, wherein:
generating the input data using the image and the contextual prompt comprises:
generating an updated image based on the contextual prompt; and
generating the input data using the updated image.

3. The method of claim 1, wherein:
generating the input data using the image and the contextual prompt comprises:
generating a segmentation mask by providing the image and the contextual prompt to a segmentation model; and
generating the input data using the image and the segmentation mask.

4. The method of claim 1, wherein:
generating the input data using the image and the contextual prompt comprises:
generating a textual prompt or token using the contextual prompt; and
generating the input data using the image and the textual prompt or token.

5. The method of claim 4, wherein:
the textual prompt or token indicates coordinates of a location in the image.

6. The method of claim 1, wherein:
receiving the contextual prompt concerning the image comprises detecting a user human interface device interaction.

7. The method of claim 1, wherein:
the graphical user interface includes an annotation tool; and
the contextual prompt concerning the image comprises an annotation generated using the annotation tool.

8. The method of claim 7, wherein:
the annotation tool includes a loupe, a marker, or a segmentation tool.

9. The method of claim 7, wherein:
the graphical user interface enables the user to resize an area of effect of the annotation tool.

10. The method of claim 1, wherein:
the method further includes receiving a textual prompt from the user; the input data is further generated using the textual prompt; and
the multimodal machine learning model is configured to further condition the textual response to the image on the textual prompt.

11. The method of claim 1, wherein:
the method further comprises, in response to selection of the control by the user:
generating second input data using the prompt suggestion and the image;

generating a second response by applying the second input data to the multimodal machine learning model; and providing the second response to the user.

12. The method of claim 1, wherein:

the contextual prompt indicates an object depicted in the image;

the textual response provides information about the depicted object; and the textual response is displayed on the graphical user interface as a virtual button.

13. A system for interacting with a pre-trained multimodal machine learning model, comprising:

at least one processor; and at least one non-transitory computer readable medium containing instructions that, when executed by the at least one processor, cause the system to perform operations comprising:

providing a graphical user interface configured to enable a user to interact with an image to generate a contextual prompt that indicates an area of emphasis in the image;

receiving the contextual prompt;

generating input data using the image and the contextual prompt; generating a textual response to the image by applying the input data to the multimodal machine learning model configured to condition the textual response to the image on the contextual prompt; and providing the textual response to the user, wherein:

the textual response comprises a prompt suggestion, and providing the textual response comprises displaying a selectable control in the graphical user interface, the selectable control being programmed to enable the user to select the prompt suggestion.

14. The system of claim 13, wherein:

generating the input data using the image and the contextual prompt comprises:

generating an updated image based on the contextual prompt; and generating the input data using the updated image.

15. The system of claim 13, wherein:

generating the input data using the image and the contextual prompt comprises:

generating a segmentation mask by providing the image and the contextual prompt to a segmentation model; and generating the input data using the image and the segmentation mask.

16. The system of claim 13, wherein:

generating the input data using the image and the contextual prompt comprises:

generating a textual prompt or token using the contextual prompt, the textual prompt or token indicating coordinates of a location in the image; and generating the input data using the image and the textual prompt or token.

17. The system of claim 13, wherein:

the graphical user interface includes an annotation tool; and the contextual prompt concerning the image comprises an annotation generated using the annotation tool.

18. The system of claim 17, wherein:

the annotation tool includes a loupe, a marker, or a segmentation tool;

the graphical user interface enables the user to resize an area of effect of the annotation tool;

the operations further include receiving a textual prompt from the user;

the input data is further generated using the textual prompt; and the multimodal machine learning model is configured to further condition the textual response to the image on the textual prompt.

19. The system of claim 13, wherein:

the operations further comprise, in response to selection of the control by the user:

generating second input data using the prompt suggestion and the image;

generating a second response by applying the second input data to the multimodal machine learning model; and providing the second response to the user.

20. The system of claim 19, wherein:

the contextual prompt indicates an object depicted in the image;

the textual response provides information about the depicted object; and the textual response is displayed on the graphical user interface as a virtual button.

* * * * *